United States Patent
Kanematsu et al.

(10) Patent No.: US 6,357,286 B1
(45) Date of Patent: Mar. 19, 2002

(54) SURFACE TEXTURE MEASURING APPARATUS

(75) Inventors: Toshihiro Kanematsu; Hideki Mishima; Masanobu Kataoka, all of Miyazaki; Takafumi Kano; Kazushige Ishibashi, both of Kure, all of (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/553,313

(22) Filed: Apr. 20, 2000

(30) Foreign Application Priority Data

Apr. 27, 1999 (JP) .............................. 11-120751

(51) Int. Cl.[7] .................. G01B 5/28; G01B 21/30; G12B 21/02; G01N 13/10
(52) U.S. Cl. ........................................... 73/105
(58) Field of Search .................................. 73/105, 104

(56) References Cited

U.S. PATENT DOCUMENTS 4,736,208 A 4/1988 Schmidt .................... 346/33 R

*Primary Examiner*—Daniel S. Larkin
(74) *Attorney, Agent, or Firm*—Oliff & Berridge PLC

(57) ABSTRACT

A surface texture measuring apparatus that ensures detection of surface texture of a workpiece even when the surface has a steep unevenness. A detecting device having a stylus is moved in the X axis direction along the surface of the workpiece, and displacement in the Z axis direction is converted into electric signals to detect unevenness of the surface of the workpiece. When the surface has a steep unevenness and the amount of displacement in the Z axis direction reaches or exceeds a threshold, a Z axis detected value and an X axis detected value obtained at that moment are output. The moving speed of the detecting device is decreased when the surface has a steep unevenness, while the moving speed is increased when the surface does not have a steep unevenness, making it possible to improve following characteristics and to reduce measurement time.

17 Claims, 3 Drawing Sheets

SURFACE TEXTURE MEASURING APPARATUS

BACKGROUND OF THE INVENTION

1. Field of the Invention

The present invention relates to surface texture measuring apparatuses, and more particularly to measurement of an object (workpiece) having a steep unevenness.

2. Description of the Related Art

Surface texture measuring apparatuses are commonly known that scan a surface of a workpiece with a detector having a stylus to measure unevenness (or roughness) of the surface.

In such a surface texture measuring apparatus, the stylus is moved in a fixed direction (direction of the X axis), and displacement of the stylus in the vertical direction (direction of the Z axis) caused by unevenness of the workpiece is converted to electric signals, which are sampled by a scale signal or a fixed time signal, so that the unevenness is displayed on a display device or printed by a printing device as a function of the traveled distance (in the X axis direction).

FIG. 4 shows the values detected in accordance with a conventional sampling method. In FIG. 4, the horizontal axis is the X axis indicating the traveled distance of the detector in the X axis direction (position in the X axis direction), and the vertical axis indicates displacement in the Z axis direction, i.e. the amount of unevenness. A dot in the figure denotes the value detected at a sampling time. The values are sampled at an interval of a fixed distance L in the X axis direction, and output as detected values (x, z).

On the other hand, in a common commercially available surface texture measuring apparatus, the values are detected by sampling a detection signal at a fixed time interval, rather than by sampling at an interval of a fixed distance in the X axis direction, because the detector moves at a fixed speed. However, precisely speaking, the moving speed of the stylus is not constant, and accurate calibration of the moving speed is difficult. Therefore, a high-precision surface texture measuring apparatus is provided with a scale disposed along the X axis to accurately measure the position of the stylus (or detector) with respect to the workpiece for sampling.

When the surface of the workpiece is relatively smooth with only a slight unevenness, data can be sampled at substantially equal intervals along the traveling direction (X axis) of the detector either by an X axis scale signal or by a fixed time signal. However, when the workpiece has a surface with a steep unevenness, the sampling intervals along the surface of the workpiece are not always constant, resulting in a problem that proper data on unevenness of the surface of the workpiece cannot be obtained.

For example, even by the method of sampling data at intervals of a fixed distance L as shown in FIG. 4, when a steep slope is present at the surface of the workpiece, data is not sampled until a position L2 after a position L1, and therefore unevenness data is lost between the positions L1 and L2. Thus, the shape of the surface of the workpiece cannot be accurately ascertained.

In addition, when such a sudden change occurs in the Z axis direction, the stylus may not accurately follow the surface of the workpiece due to limitation of following frequency response of the stylus if the detecting stylus is driven at a fixed speed.

SUMMARY OF THE INVENTION

An object of the present invention is to provide a surface texture measuring apparatus that ensures detection of unevenness of the surface of a workpiece even when the surface has a steep unevenness.

In order to achieve the above object, the present invention, according to one aspect of the invention, provides a surface texture measuring apparatus for causing relative movement of a stylus in a first axis direction along a workpiece to detect displacement of the stylus in a second axis direction perpendicular to the first axis direction resulting from the surface texture of the workpiece, comprising means for detecting the amount of displacement in the second axis direction, and means for changing a detection interval in the first axis direction in accordance with the amount of displacement. Thus, the detection interval (interval between L1 and L2 in FIG. 4) in the first axis direction is not fixed but changed in accordance with the amount of displacement in the second axis direction, making it possible to deal with a steep unevenness. Preferably, the detection interval is decreased as the amount of displacement increases.

The means for changing a detection interval preferably outputs the position in the first axis direction and the displacement in the second axis direction obtained when the amount of displacement reaches or exceeds a threshold. Consequently, detection timing is determined by the amount of displacement in the second axis direction when the surface of the workpiece has a steep unevenness.

When the amount of displacement is smaller than the threshold, the means for changing a detection interval preferably outputs the position in the first axis direction and the displacement in the second axis direction obtained when the amount of movement in the first axis direction reaches a predetermined value. As a result, detection timing is determined by the amount of movement in the first axis direction when the surface of the workpiece does not have a steep unevenness. In summary, the detection timing is determined by the amount of displacement in the second axis direction when the surface of the workpiece has a steep unevenness, while it is determined by the amount of displacement in the first axis direction when a steep unevenness is not present, making it possible to deal with either a smooth or a rough surface of the workpiece. When the amount of displacement is smaller than the threshold, it is also possible to output the position in the first axis direction and the displacement in the second axis direction at the time of reaching a predetermined sampling time.

Alternatively, the means for changing a detection interval preferably outputs the position in the first axis direction and the displacement in the second axis direction on the earlier occasion of the amount of displacement reaching or exceeding the threshold, and the amount of movement in the first axis direction reaching a predetermined value. When the surface of the workpiece has only a slight unevenness, the amount of movement in the first axis direction first reaches the predetermined value to determine the detection timing. On the other hand, when the surface has a steep unevenness, the amount of displacement in the second axis direction first reaches the threshold to determine the detection timing.

According to another aspect of the invention, the present invention provides a surface texture measuring apparatus for moving a stylus in a first axis direction along a workpiece to detect displacement of the stylus in a second axis direction perpendicular to the first axis direction resulting from the surface texture of the workpiece, comprising means for detecting the amount of displacement in the second axis direction, and means for changing a moving speed of the stylus in the first axis direction in accordance with the amount of displacement. The moving speed in the first axis direction is not fixed but is varied in accordance with the amount of displacement in the second axis direction, to thereby allow the stylus to accurately follow the surface of the workpiece. Preferably, the moving speed is decreased with an increase in the amount of displacement. Alternatively, the moving speed can be decreased when the amount of displacement reaches or exceeds a threshold.

According to a still another aspect, the present invention provides a surface texture measuring apparatus for moving a stylus in a first axis direction along a workpiece to detect displacement of the stylus in a second axis direction perpendicular to the first axis direction resulting from the surface texture of the workpiece, comprising means for detecting the amount of displacement in the second axis direction, means for changing a detection interval in the first axis direction in accordance with the amount of displacement, and means for changing a moving speed of the stylus in the first axis direction in accordance with the amount of displacement. The detection interval in the first axis direction (interval between the positions L1 and L2 in FIG. 4) is changed in accordance with the amount of displacement in the second axis direction, and the relative speed is also changed, thereby improving response performance of the stylus and detection resolution, and achieving highly precise measurement.

DESCRIPTION OF THE PREFERRED EMBODIMENTS

Embodiments of the present invention will now be described.

Figure 1:
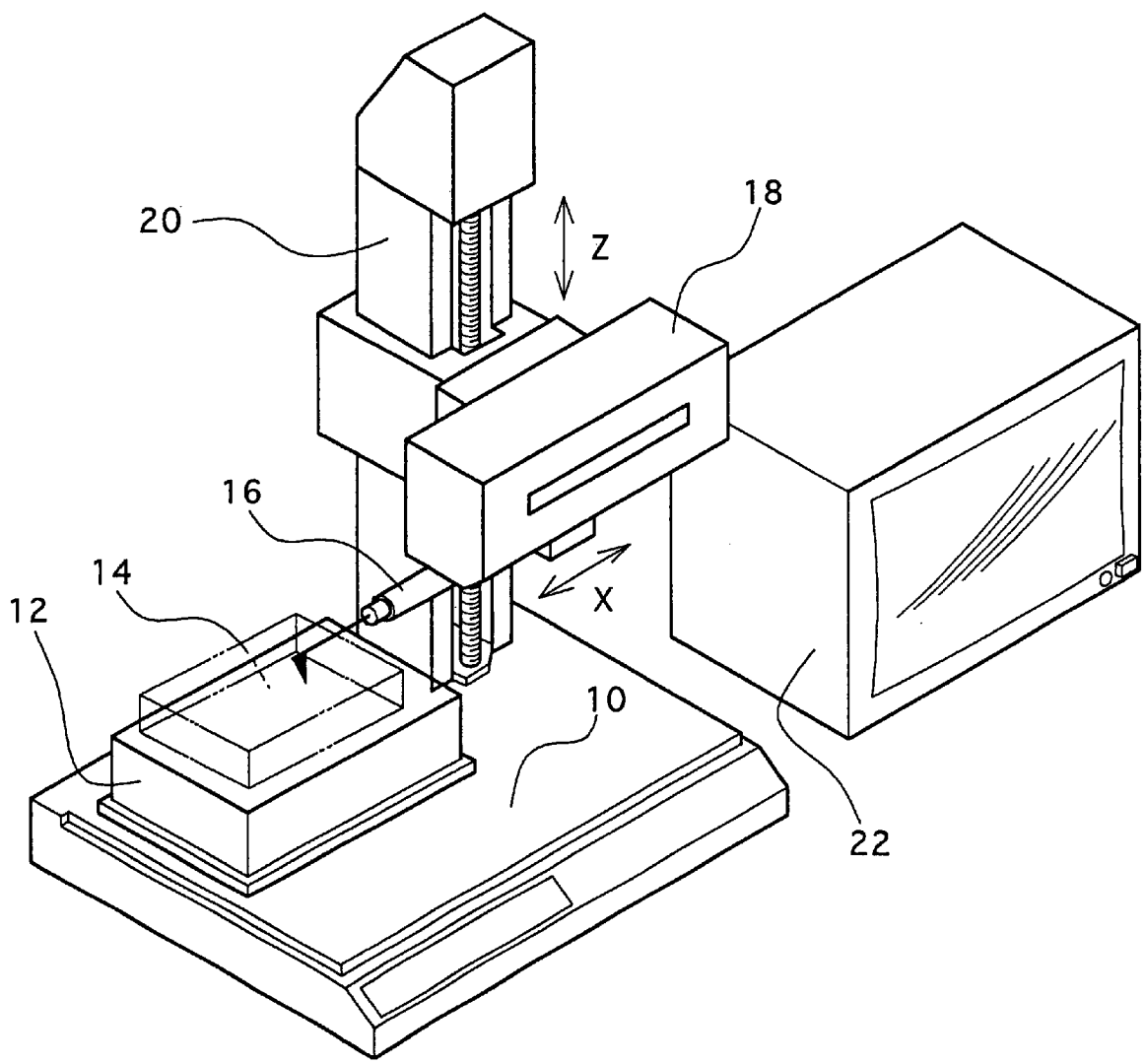
FIG. 1 illustrates the external appearance and structure of a measuring apparatus according to one embodiment of the present invention.

FIG. 1 shows the external appearance and structure of a surface texture measuring apparatus according to the present embodiment. A mounting table 12 is mounted on a base platform 10, and a workpiece 14 is fixed on the mounting table 12. A detecting device 16 having a stylus is provided on the base platform 10 by way of a driving device 18 and a strut 20. The detecting device 16 is driven by the driving device 18 in the directions indicated as X (X axis direction) and Z (Z axis direction) in the figure. The tip of the stylus is brought into contact with a surface of the workpiece 14 by driving the device 16 in the Z direction, and unevenness of the surface of the workpiece 14 is detected as displacement of the stylus in the Z direction while moving the device 16 in the X direction. The detected amount of unevenness is converted to electric signals, supplied to a display device 22, such as a computer display or the like, and displayed thereon as described above.

When a computer display is used for the display device 22, a control device of the computer can control and drive the driving device 18 through a communication device, and detection signals from the detecting device 16 can be processed and displayed on the display device 22.

Figure 2:
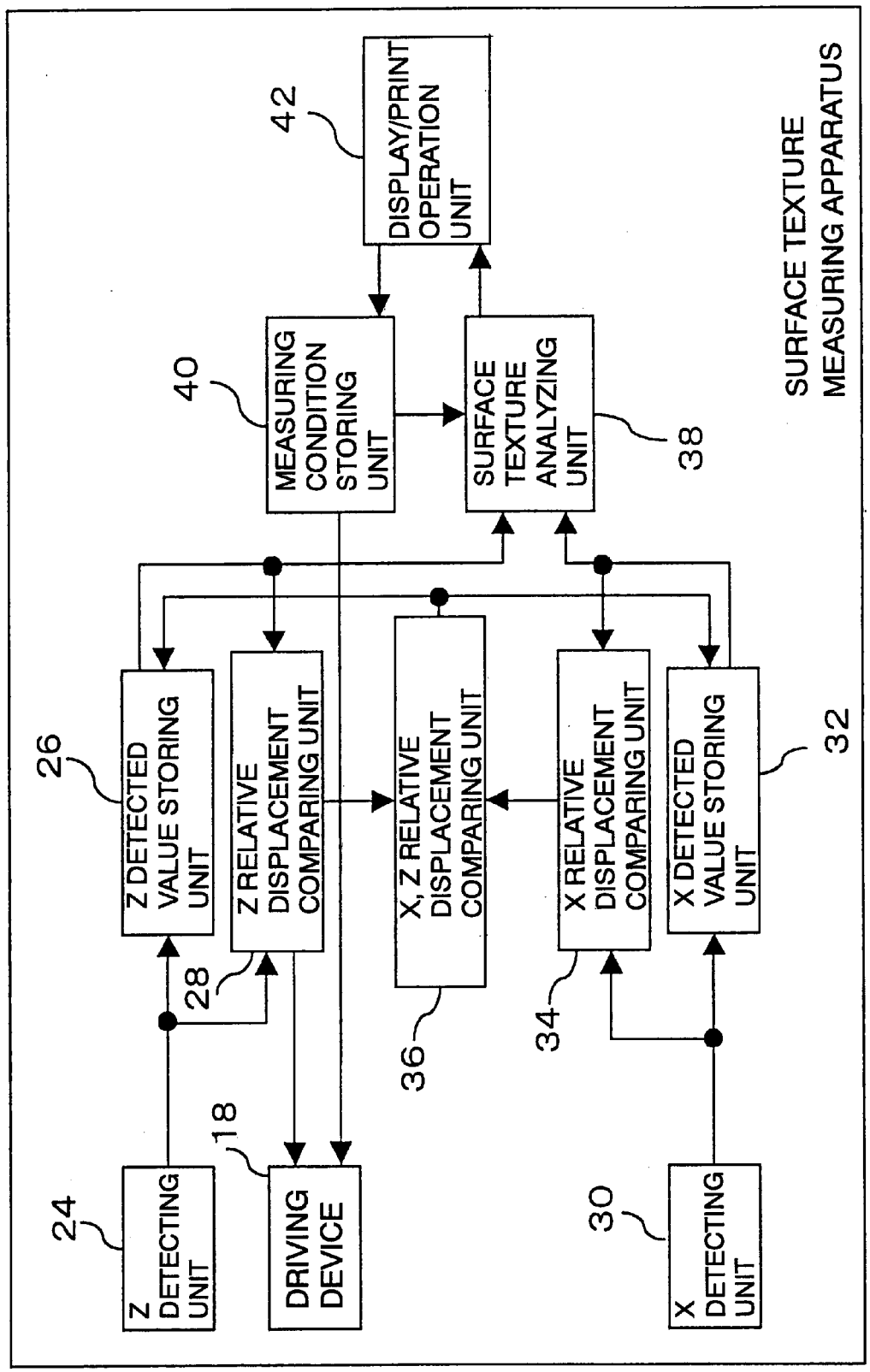
FIG. 2 is a block diagram illustrating a configuration of the measuring apparatus according to one embodiment of the present invention.

FIG. 2 is a block diagram showing a configuration of the apparatus according to the present embodiment. A Z detecting unit 24 corresponds to the detecting device 16 shown in FIG. 1, and detects the Z axis, i.e. unevenness of the surface of the workpiece, to be supplied to a Z detected value storing unit 26 and a Z relative displacement comparing unit 28.

The Z detected value storing unit 26 is formed by a RAM and the like, and sequentially stores the value detected in the Z axis direction (hereinafter referred to as the Z axis detected value or Z detected value). The Z relative displacement storing unit 28 compares the current Z axis detected value with the Z detected value last stored in the Z detected value storing unit 26, i.e. the Z detected value immediately previous to the current value, thereby calculating the amount of displacement in the Z direction to determine whether or not the amount of displacement exceeds a threshold Lz. The unit 28 then outputs the result to an X, Z relative displacement storing unit 36. When the amount of displacement is equal to, or exceeds, the threshold Lz, a control signal is output to the driving device 18 to reduce the moving speed of the Z detecting unit 24, i.e. the detecting device 16, in the X axis direction. As a control signal, a velocity coefficient value inversely proportional to the amount of displacement in the Z axis direction, or the like, is produced and supplied, so that the speed is more greatly reduced as the amount of displacement increases. The moving speed will be described hereinafter.

On the other hand, an X detecting unit 30 includes a scale for detecting the position of the Z detecting unit 24, i.e. the detecting device 16, in the X axis direction, and supplies this X axis detected value to an X detected value storing unit 32 and an X relative displacement comparing unit 34.

The X detected value storing unit 32 includes a RAM and the like, and sequentially stores the values detected in the X axis direction (hereinafter referred to as the X axis detected value or X detected value).

The X relative displacement comparing unit 34 compares the current X axis detected value and the X detected value last stored in the X detected value storing unit 32, i.e. the X axis detected value immediately previous to the current value, to calculate the amount of displacement. The unit 34 determines whether or not the amount of displacement exceeds a predetermined value Lx, and provides the result to the X, Z relative displacement comparing unit 36.

The X, Z relative displacement comparing unit 36 produces a sampling signal based on the results supplied from the Z relative displacement comparing unit 28 and the X relative displacement comparing unit 34, and provides the signal to the Z detected value storing unit 26 and the X detected value storing unit 32. More specifically, the unit 36 produces the sampling signal when the amount of displacement in the Z axis is equal to, or exceeds, the threshold Lz, or when the amount of displacement in the X axis direction is equal to, or exceeds, the predetermined value Lx. In other words, the X, Z relative displacement comparing unit 36 produces and provides the sampling signal when the amount of displacement in the Z axis direction reaches or exceeds the threshold Lz or when the amount of displacement in the X axis direction reaches or exceeds the value Lx, whichever is the earliest. Assuming that the value Lx is equal to the conventional sampling interval L shown in FIG. 4, the sampling signal is produced when the amount of displacement in the X axis direction reaches the value Lx if the surface of the workpiece does not have a steep unevenness (this is the same as the conventional method). On the other hand, if the surface of the workpiece has a steep unevenness, the amount of displacement in the Z axis direction reaches the threshold Lz before the amount of X axis displacement reaches the predetermined value Lx, and the sampling signal is produced. That is, the sampling timing is determined based on the amount of displacement in the Z axis direction when the surface of the workpiece has a steep unevenness, while it is determined based on the amount of displacement in the X axis direction as in the conventional method, not on the amount of displacement in the Z axis direction, when the unevenness of the surface is not so steep. Receiving the sampling signal, the Z detected value storing unit 26 and the X detected value storing unit 32 store the Z detected value and X detected value applied from the Z detecting unit 24 and the X detecting unit 30, respectively, using the timing of the received sampling signal.

The driving device 18 causes relative movement of the detecting device 16 in the X axis direction with respect to the surface of the workpiece 14. It should be noted that "relative movement" refers not only to the case where the workpiece 14 is fixed and the detecting device 16 is moved with respect to the workpiece, but also to the case where the detecting device 16 is fixed and the workpiece 14 is moved in the X axis direction. The moving speed during measurement of the surface texture is calculated by multiplying the standard moving speed stored in a measurement condition storing unit 40 by the velocity coefficient value supplied from the Z relative displacement comparing unit 28. Thus, when the amount of displacement in the Z axis direction is great, the moving speed is reduced from the standard, so that the stylus can follow the surface of the workpiece even when the surface has a steep unevenness. On the other hand, when the amount of Z axis displacement is small, the moving speed is increased from the standard, to thereby reduce measurement time.

The measuring condition storing unit 40 stores various measuring conditions and analyzing conditions determined by a user.

A surface texture analyzing unit 38 processes the detected values stored in the Z and X detected value storing units 26 and 32, respectively, (the detected values sampled by the sampling signal supplied from the X, Z relative displacement comparing unit 36) to analyze the surface texture of the workpiece, such as calculation of the values Ra, Ry, Rz, and Sm, using the analyzing conditions stored in the measuring condition storing unit 40, and supplies the result to a display/print operation unit 42, which includes a display device 22, a keyboard, a mouse, a printer, and the like. The unit 42 displays and outputs the analyzed result of the surface texture to the user, and also sets and edits the measuring conditions.

Figure 3:
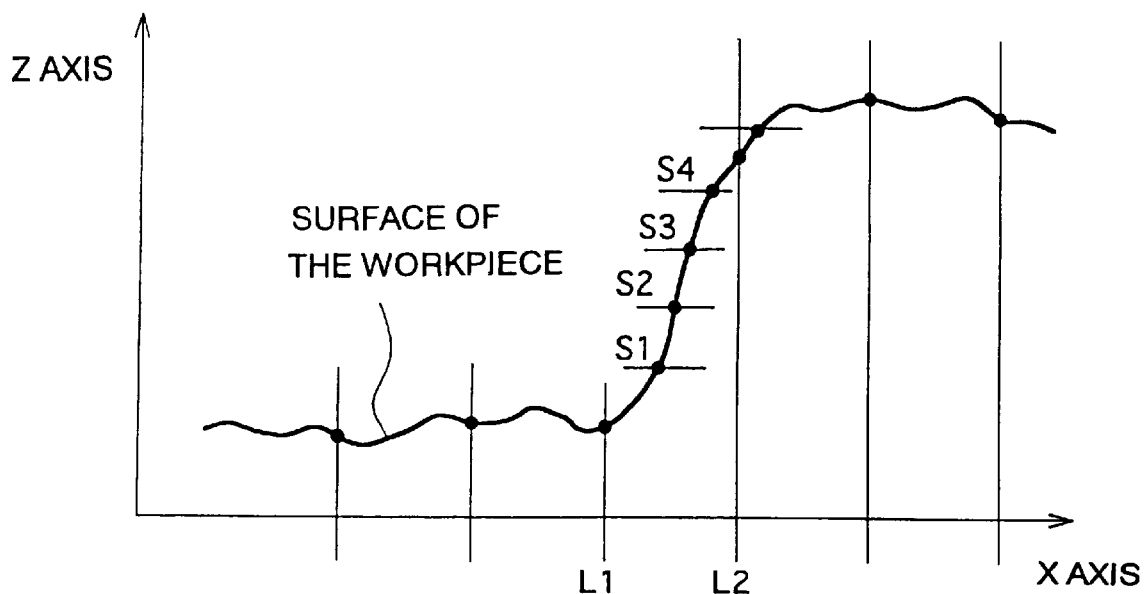
FIG. 3 illustrates Z axis detected values according to one embodiment of the present invention.
Figure 4:
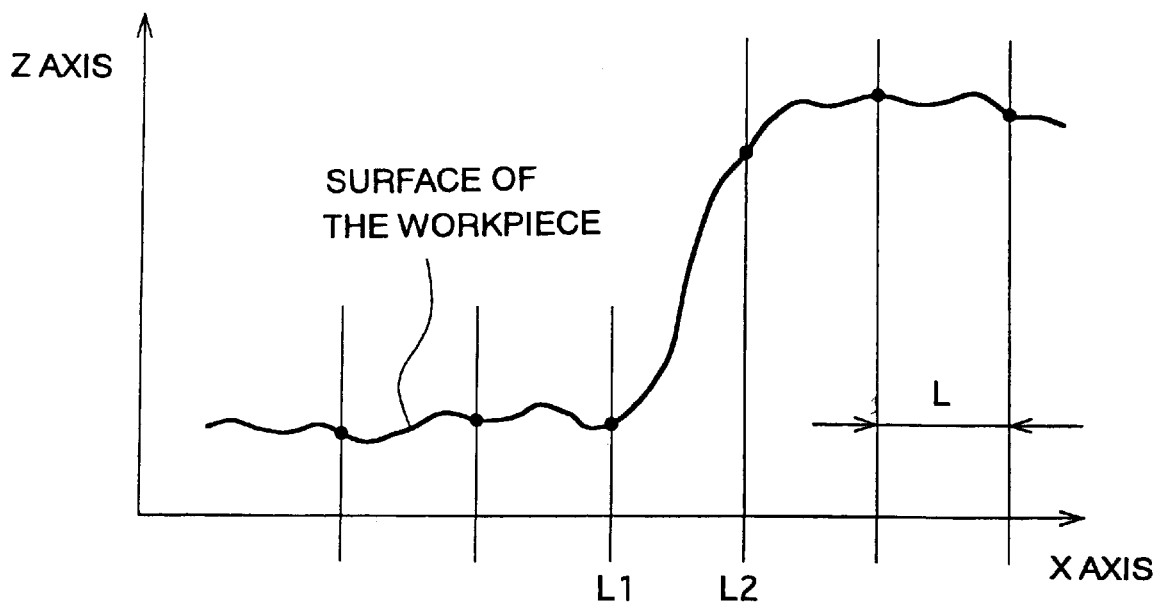
FIG. 4 illustrates Z axis detected values according to a related conventional art.

FIG. 3 shows the result obtained by using the apparatus with the above-described configuration to measure the workpiece having the surface texture as shown in FIG. 4. In the figure, the horizontal axis indicates the position in the X axis direction, while the vertical axis indicates a detected value in the Z axis direction. In accordance with the conventional method of FIG. 4, data is sampled only at the positions L1 and L2 in the X axis direction, and no values are detected therebetween. According to the present embodiment, however, data is sampled when the amount of displacement in the Z axis direction reaches the threshold Lz even if the X axis displacement amount does not reach the predetermined value Lx (=L). Therefore, as shown in the figure, data items S1, S2, S3, S4 are sampled between the positions L1 and L2, and output as detected values, so that the shape of the surface of the workpiece can be accurately ascertained even if the surface has a steep unevenness.

While in the present embodiment an example of combining a technique of producing a sampling signal when the Z axis displacement amount reaches or exceeds the threshold Lz and a technique of reducing the moving speed of the detecting device 16 (or of the workpiece) when the Z axis displacement amount reaches or exceeds the threshold Lz is described above, it is also possible to use only one of these techniques, namely, a technique of producing a sampling signal when the Z axis displacement amount reaches or exceeds the threshold Lz, or a technique of reducing the moving speed of the detecting device 16 when that amount reaches or exceeds the threshold Lz. For implementing the configuration employing the former technique, the Z relative displacement comparing unit 28 shown in FIG. 2 supplies the result of determination to the X, Z relative displacement comparing unit 36 without supplying the control signal to the driving device 18. For implementing the configuration employing the latter technique, the Z relative displacement comparing unit 28 shown in FIG. 2 provides the driving device 18 with a speed instruction signal (velocity coefficient value) to change the relative speed, and the X, Z relative displacement comparing unit 36 outputs the sampling signal only when the X axis displacement amount reaches the predetermined value Lx.

While preferred embodiments of the present invention have been described above, various modifications can be made without departing from the scope of the present invention.

For example, when an analogue device is used for the detecting device 16, an A/D converter may be used for analogue-digital conversion so that the Z relative displacement comparing unit 28 compares digital values rather than analogue voltages. In addition, when analogue voltages are compared, an immediately previous Z axis detected value stored in the Z detected value storing unit 26 may be held by a sample and hold circuit, thereby achieving an increase in speed of comparison processing with a simple configuration.

While the velocity coefficient value output from the Z relative displacement comparing unit 28 to the driving device 18 is inversely proportional to the amount of displacement in the Z axis detected value in the above example, fixed values may be used as the velocity coefficient value that are respectively assigned for the case where the amount of displacement in the Z axis detected value is smaller than the threshold, and the case where the amount is equal to, or exceeds, the threshold. With this option, the speed at which the driving device 18 moves the detecting device 16 is switched in two stages. Alternatively, a plurality of thresholds may be provided, and a fixed value may be output as the velocity coefficient value by comparison with each threshold. The speed coefficient value can be generally determined as a function of (or negatively correlated with) the Z axis displacement amount, and the specific function may be determined in accordance with the characteristics of the detecting device 16 and the measuring apparatus.

While the sampling timing is determined by comparing the Z axis displacement amount with the threshold Lz in the present embodiment, the sampling timing may be determined by comparing the change of Z axis displacement amount in time, i.e. the speed of Z axis displacement, with the threshold, and the moving speed may also be determined in this manner. A technique of comparing the amount of displacement with a threshold is equivalent to that of comparing the speed of displacement with a threshold, which is also embraced within the scope of the present invention.

Although the position in the X axis direction is detected by a scale in the above-described embodiment, a fixed time signal generator (such as a clock or a timer) may be used in place of the scale when such a high precision measurement is not required. With this option, the X relative displacement comparing unit 34 calculates the X axis displacement amount by comparing the X axis current time with the time last stored in the X detected value storing unit 32. In other words, the X axis displacement amount includes the displacement in time in addition to the displacement in the X axis position.

As the sampling timing for the Z axis detected value is determined depending on the threshold Lz in the present embodiment, the threshold Lz need not be fixed and can be adaptively changed in accordance with the workpiece to be measured.

What is claimed is:

1. A surface texture measuring apparatus for causing relative movement of a stylus in a first axis direction along a workpiece to detect displacement of said stylus in a second axis direction perpendicular to said first axis direction resulting from the surface texture of said workpiece, comprising:

means for detecting the amount of displacement in said second axis direction; and means for changing a detection interval in said first axis direction in accordance with said amount of displacement.

2. The surface texture measuring apparatus according to claim 1, wherein said means for changing a detection interval reduces said detection interval as said amount of displacement increases.

3. The surface texture measuring apparatus according to claim 1, wherein said means for changing a detection interval outputs the position in said first axis direction and the displacement in said second axis direction obtained when said amount of displacement reaches or exceeds a threshold.

4. The surface texture measuring apparatus according to claim 3, wherein said means for changing a detection interval outputs the position in said first axis direction and the displacement in said second axis direction obtained when the amount of movement in said first axis direction reaches a predetermined value if said amount of displacement is smaller than said threshold.

5. The surface texture measuring apparatus according to claim 3, wherein said means for changing a detection interval outputs the position in said first axis direction and the displacement in said second axis direction at the time of reaching a predetermined sampling time if said amount of displacement is smaller than said threshold.

6. The surface texture measuring apparatus according to claim 1, wherein said means for changing a detection interval outputs the position in said first axis direction and the displacement in said second axis direction either when said amount of displacement reaches or exceeds a threshold or when the amount of movement in said first axis direction reaches a predetermined value, whichever is the earlier.

7. A surface texture measuring apparatus for moving a stylus in a first axis direction along a workpiece to detect displacement of said stylus in a second axis direction perpendicular to said first axis direction resulting from the surface texture of said workpiece, comprising:

means for detecting the amount of displacement in said second axis direction; and means for changing a moving speed of said stylus in said first axis direction in accordance with said amount of displacement.

8. The surface texture measuring apparatus according to claim 7, wherein said means for changing a moving speed reduces said moving speed as said amount of displacement increases.

9. The surface texture measuring apparatus according to claim 7, wherein said means for changing a moving speed reduces said moving speed when said amount of displacement reaches or exceeds a threshold.

10. A surface texture measuring apparatus for moving a stylus in a first axis direction along a workpiece to detect displacement of said stylus in a second axis direction perpendicular to said first axis direction resulting from the surface texture of said workpiece, comprising:

means for detecting the amount of displacement in said second axis direction;

means for changing a detection interval in said first axis direction in accordance with said amount of displacement; and means for changing a moving speed of said stylus in said first axis direction in accordance with said amount of displacement.

11. The surface texture measuring apparatus according to claim 10, wherein said means for changing a detection interval reduces said detection interval as said amount of displacement increases.

12. The surface texture measuring apparatus according to claim 10, wherein said means for changing a detection interval outputs the position in said first axis direction and the displacement in said second axis direction obtained when said amount of displacement reaches or exceeds a threshold.

13. The surface texture measuring apparatus according to claim 12, wherein said means for changing a detection interval outputs the position in said first axis direction and the displacement in said second axis direction obtained when the amount of movement in said first axis direction reaches a predetermined value if said amount of displacement is smaller than said threshold.

14. The surface texture measuring apparatus according to claim 12, wherein said means for changing a detection interval outputs the position in said first axis direction and the displacement in said second axis direction at the time of reaching a predetermined sampling time if said amount of displacement is smaller than said threshold.

15. The surface texture measuring apparatus according to claim 10, wherein said means for changing a detection interval outputs the position in said first axis direction and the displacement in said second axis direction either when said amount of displacement reaches or exceeds a threshold or when the amount of movement in said first axis direction reaches a predetermined value, whichever is the earlier.

16. The surface texture measuring apparatus according to claim 10, wherein said means for changing a moving speed reduces said moving speed as said amount of displacement increases.

17. The surface texture measuring apparatus according to claim 10, wherein said means for changing a moving speed reduces said moving speed when said amount of displacement is reaches or exceeds a threshold.

* * * * *